Patented Nov. 13, 1951

2,574,763

UNITED STATES PATENT OFFICE 2,574,763

FREEZABLE SELF-SUSTAINING BODY OF SILICA GEL AND METHOD OF MAKING THE SAME

Edward Oneal Sears, Alameda, Calif.

No Drawing. Application November 29, 1948, Serial No. 62,601

13 Claims. (Cl. 252—70)

The present invention relates to improvements in a freezable self-sustaining body of silica gel and method of making the same, and its principal object is to provide a refrigeration brick particularly adapted for refrigerating individual packages of perishables for storing and transportation purposes. This application is a continuation in part of my co-pending application Serial No. 1,900, filed January 12, 1948, now abandoned.

Bricks of this type have been used heretofore, but it is proposed in the present invention to provide a brick of superior characteristics and one that can be manufactured more cheaply than has been possible in prior methods.

More particularly it is proposed to provide a brick that does not require any mechanical supporting structure and can be made, in its preferred form, to contain active refrigerating material to within a few percent of the volume occupied by the brick whereby the effective melting period and the refrigerating capacity of the brick are greatly extended as compared with bricks requiring a physical supporting means.

It is further proposed to provide a method of making the brick which is extremely simple, and uses materials abundantly available at little expense.

More particularly it is proposed to use as an anti-freeze agent sodium chloride which I have found to be superior to other anti-freezing agents such as calcium chloride, although the latter is commonly considered more effective since it has a lower freezing point. It should be understood, of course, that for certain phases of the invention I do not wish to confine myself to the use of sodium chloride since the general aspects of the invention are of great value regardless of the particular anti-freeze medium employed.

Referring to the invention in detail it is proposed to produce a gel containing a certain amount of sodium chloride, to slice the gel into bricks, to freeze the bricks at a low temperature, approximately 20 degrees F. below zero and to wrap the bricks thus formed in cellophane or similar material ready for the market.

In carrying out my invention, I preferably use a wooden container of suitable size, rectangular in form and made with removable side walls.

Into this container I pour 200 parts by volume of a sodium silicate solution. This solution may consist of the commercial solution generally known in the market as "N-Sodium Silicate," as manufactured by Philadelphia Quartz Company of California, having a specific gravity of 1.39, with an analysis of 8.9% $N_2O$ and 28.4% $SiO_2$. The term "N-Sodium Silicate" used in the claims is intended to cover the above-defined and equivalent solutions.

Next I pour into the container 150 parts by volume of a 7½% hydro-chloric acid solution which may contain a desired amount of blue stone, while stirring the mixture. This mixture will retain its liquid form for an extended period of time, but will gel if left alone for say 24 hours.

But, without waiting for this slow gelling process, I pour into the mixture 100 parts by volume of a 10% sodium chloride solution while stirring the mixture to cause the brine to become well distributed through the solution. This causes an almost immediate gelling of the mixture, and the operator has to use considerable care in agitating the mixture in the short period available, since the agitator must be withdrawn before the mixture gels, so as to produce a body of uniform structure.

After waiting a few minutes to allow the gel to harden, the operator may remove the sides and the mixture will form a self-sustaining body of gelatinous material in which the sodium chloride is evenly distributed throughout the body in liquid form and is suspended and locked in the gelatin so that it cannot move within the body during the subsequent freezing process.

This body is now sufficiently stiff for slicing horizontally and vertically into desired forms convenient for handling in freezing, possibly into bars approximately 2 x 4 x 6", which is most convenient for the market.

The bars thus obtained are then placed on a tray and moved into a refrigerator where they are frozen to form ice, preferably at a temperature of approximately 20 degrees Fahrenheit below zero. When they are taken out of the refrigerator the bars are rigid and solid, dry to the feel and they remain dry for a considerable period if exposed to normal room temperature.

The bars are then wrapped in cellophane or some other water-tight material and are ready for use.

An important feature of the present invention is the dispersion of the sodium chloride throughout the gelatinous body. If a body of plain salt water were frozen, it would begin freezing from the outside and the salt would work toward the inside, the solution becoming stronger and stronger within the block of ice. The gelatinous body keeps the salt from segregating and causes it to crystallize during the freezing process in infinitesimally small particles uniformly distributed throughout the body.

In the process as outlined hereinabove the 200 parts of sodium silicate solution contain about 150 parts of water and 50 parts of sodium silicate, the 150 parts of acid solution about 140 parts of water and 10 parts of acid, and the 100 parts of brine about 90 parts of water and 10 parts of salt so that the total mixture contains approximately 380 parts of water and 70 parts of the other ingredients, making the proportion of water to that of the other ingredients approximately 5½ to 1. The total amount of liquid is 450 parts containing about 10 parts of salt, so that the salt content of the final product is approximately 2%. This is the preferred percentage of salt, although the latter may be varied, depending upon results desired. For practical purposes the salt present should not be less than 1% and not more than 10%.

This method leads to uniformly satisfactory results, although it should be understood that the proportions are not necessarily critical and that numerous variations may be made without departing from the spirit of the present invention.

The total amount of water used has a certain effect on the speed with which the gelling action takes place. If too little water is used the mass, upon the pouring of the third ingredient, may gel too quickly to allow of the proper diffusion of the third ingredient through the other two ingredients. If too much water is used, the mass may not gel to the desired consistency within reasonable time. While the above proportion of 5½ to 1 has given satisfactory results, I do not desire to limit myself to the exact proportion, the principal idea being to mix the three ingredients in such solutions and proportions that upon the addition of the third ingredient the mass will gel quickly into a self-sustaining body, but leaving enough time to effect a thorough mixing of the ingredients.

The total amount of salt present in the final gel is approximately 2%. But here again, this percentage is not critical and can be varied depending upon results desired. Reasonable limits may be set at 1% as the minimum and 10% as the maximum.

In my co-pending application I proposed to mix 25 parts of a sodium silicate solution, the commercial N brand, which is approximately 50% water, into 66 parts of brine (3% solution) and to then add the acid to the point of neutralization. In this process the proportion of water to the total of the other ingredients was approximately 4:1, but the results were not always satisfactory, since the mass would gel too quickly, at times, to produce a gel of uniform consistency. The proportion of salt in the final mixture was also approximately 2%. This process might be used by substituting the proportions and solutions hereinabove given.

It is also feasible, in the present process, to change the order of the steps by first mixing the brine and the acid solution and then adding the sodium silicate solution, the result being approximately the same where similar proportions are used.

The blue stone, added to the acid solution, serves as a stabilizing agent and tends to delay the gelling and to make the process less critical. In should be added substantially in the proportion of 1% of the acid solution.

While I preferably use hydro-chloric acid in my process, it is apparent that other acids, such as nitric acid and sulfuric acid, may be substituted without invention and that such acids should be considered equivalents of hydro-chloric acid.

Although I have described only a few practical and commercially feasible methods of producing the gelatinous body, it should be understood that any freezable, self-sustaining body of gelatinous material which has the proper amount of sodium chloride uniformly distributed therethrough so as to lock the sodium chloride during the freezing process, and to bring about a uniform distribution of fine sodium chloride crystals in the frozen body, should be considered as coming within the scope of the present invention.

In use, when perishables are to be shipped in individual packages, a brick is placed in each package in suitable heat exchange relation with the contents of the package and serves to retain the perishables in properly cooled condition at least for a sufficient length of time for overland travel across the country.

In this connection I desire to point out the particular advantage of using sodium chloride as an anti-freeze agent rather than calcium chloride. In the freezing process the salt is mechanically separated from the ice and forms minute solid particles throughout the brick. During the melting process the salt particles cooperate with the ice crystals in reducing the temperature, somewhat similar to the process employed in the conventional ice cream freezer. The salt, as it goes into solution during the melting process, absorbs heat from any material with which it is in contact which in the present case are the ice crystals of the brick. The fine and even distribution of the salt particles throughout the brick makes the heat absorption of the salt particularly effective. In addition to this, the ice absorbs heat during the melting process, and the added effect of the two heat absorbing bodies makes the brick particularly effective as a refrigerating unit for a considerable length of time.

Calcium chloride does not offer the same advantage. When a calcium chloride mixture is frozen, at temperatures commercially practical, the water separates out in crystals as in the previous instance, but the calcium chloride does not freeze out into crystals, and is only concentrated into syrupy solutions. During the melting process, therefore, there is no dissolving effect which in the sodium chloride mixture is responsible for the intensified cooling effect. On the contrary, it appears that the mixing of the concentrated calcium chloride solutions formed during the freezing process, with the melting ice crystals produces a heating effect which greatly reduces the effectiveness of calcium chloride as a heat absorbing medium, in spite of the fact that it has a lower freezing point than sodium chloride when in solution.

If the temperatures of two bricks, one containing calcium chloride and one sodium chloride were compared in graphs, it would be found that after a brief period of even temperature, the temperature of the former would abruptly rise and then remain at that level, while the temperature of the latter, after a brief and limited rise, would drop below the initial temperature and remain at that level.

However, I believe that one of the essential features of the present invention is the incorporation of the anti-freeze agent in a gelatinous body, followed by the freezing of the latter at low temperature, and this would seem to be a novel contribution to the art regardless of the particular anti-freeze agent used.

It should also be understood that the proportions given and the strength of the solutions are not necessarily critical and that changes may be made within wide ranges depending upon results desired and materials available, as long as the anti-freeze agent is thoroughly distributed through a gelatinous body substantially self-sustaining and adapted to be frozen.

It should be noted that the gel used in my process is mostly water, or liquid, at least over 90%. Since the refrigerating capacity of the brick depends greatly upon the amount of ice that is actually converted into water or liquid during the melting process, it is apparent that the amount of liquid present is a very important factor.

I claim:

1. A freezable, self-sustaining body of silica gel formed by the reaction of water, "N Sodium Silicate," hydro-chloric acid and sodium chloride substantially in the proportions of 200 parts of a 50% aqueous solution of "N Sodium Silicate," 150 parts of a 7½% aqueous solution of hydro-chloric acid and 100 parts of a 10% aqueous solution of sodium chloride, the sodium chloride being uniformly distributed through the body in liquid form.

2. A freezable, self-sustaining body of silica gel formed by the reaction of water, "N Sodium Silicate," hydro-chloric acid and sodium chloride substantially in the proportions of 330 parts of water, 100 parts of "N Sodium Silicate," 10 parts of hydro-chloric acid and 10 parts of sodium chloride, the latter being uniformly distributed through the body in liquid form.

3. A free frozen body of silica hydrogel having sodium chloride uniformly distributed throughout the body in the form of infinitesimally small crystals, the sodium chloride occupying approximately 2% of the volume of the body.

4. A free frozen body of silica hydrogel having sodium chloride uniformly distributed throughout the body thereof in the form of infinitesimally small crystals, the sodium chloride occupying substantially between 1 and 10 percent of the volume of the body.

5. A free frozen body of silica gel formed by the reaction of water, "N Sodium Silicate," hydro-chloric acid and sodium chloride substantially in the proportions of 200 parts of a 50% solution of "N Sodium Silicate," 150 parts of a 7½% hydro-chloric acid solution and 100 parts of a 10 percent sodium chloride solution, the sodium chloride being uniformly distributed throughout the body in the form of extremely fine crystals.

6. A free frozen body of silica gel formed by the reaction of water, "N Sodium Silicate," hydro-chloric acid and sodium chloride substantially in the proportions of 330 parts of water, 100 parts of "N Sodium Silicate," 10 parts of hydro-chloric acid and 10 parts of sodium chloride, the latter being uniformly distributed throughout the body in the form of extremely fine crystals.

7. The method of producing a low freezing gel which comprises the mixing of 200 parts of a 50% aqueous solution of "N Sodium Silicate," 150 parts of an aqueous 7½% hydro-chloric acid solution and 100 parts of an aqueous 10% sodium chloride solution.

8. The method of producing a low freezing gel which comprises the mixing of aqueous solutions of "N Sodium Silicate," hydro-chloric acid and sodium chloride, the solutions being proportioned in themselves and with respect to one another to produce a silica gel formed by the reaction of approximately 330 parts of water, 100 parts of "N Sodium Silicate," 10 parts of hydro-chloric acid, and 10 parts of sodium chloride.

9. The method of producing a low freezing gel which comprises the mixing of aqueous solutions of "N Sodium Silicate," hydro-chloric acid and sodium chloride, the solutions being proportioned in themselves and with respect to one another to produce a silica gel formed by the reaction of approximately 330 parts of water, 100 parts of "N Sodium Silicate," 10 parts of hydro-chloric acid, and from 5 to 50 parts of sodium chloride.

10. The method of producing a low freezing gel which comprises the mixing in a container of aqueous solutions of "N-Sodium Silicate," hydro-chloric acid and sodium chloride, substantially in the proportions of 330 parts of water, 100 parts of "N-Sodium Silicate," 10 parts of hydro-chloric acid and from 5 to 50 parts of sodium chloride to form a self-sustaining body of silica hydrogel and freeing the body from the container to render the body accessible for slicing operations.

11. The method of producing free frozen bodies of silica hydrogel which comprises the mixing in a container of aqueous solutions of "N-Sodium Silicate," hydro-chloric acid and sodium chloride, substantially in the proportions of 330 parts of water, 100 parts of "N-Sodium Silicate," 10 parts of hydro-chloric acid and from 5 to 50 parts of sodium chloride to form a self-sustaining body of silica hydrogel, freeing the body from the container, slicing the body to produce bricks smaller than the body and freezing the bricks.

12. The method of producing a low freezing gel which comprises the mixing of aqueous solutions of "N Sodium Silicate," hydro-chloric acid and sodium chloride, substantially in the proportions of 330 parts of water, 100 parts of "N Sodium Silicate," 10 parts of hydro-chloric acid, and 10 parts of sodium chloride.

13. The method of producing a low freezing gel which comprises the mixing of aqueous solutions of "N Sodium Silicate," hydro-chloric acid and sodium chloride, substantially in the proportions of 330 parts of water, 100 parts of "N Sodium Silicate," 10 parts of hydro-chloric acid, and from 5 to 50 parts of sodium chloride.

EDWARD ONEAL SEARS.

REFERENCES CITED

The following references are of record in the file of this patent:

UNITED STATES PATENTS

| Number | Name | Date |
|---|---|---|
| 1,783,396 | Travers et al. | Dec. 2, 1930 |
| 1,855,659 | Wright | Apr. 26, 1932 |
| 1,861,957 | Remer | June 7, 1932 |
| 2,280,650 | Kassel | Apr. 21, 1942 |